United States Patent Office 3,647,841
Patented Mar. 7, 1972

3,647,841
NICKEL ORGANOPHOSPHITES
Otto S. Kauder, Jamaica, N.Y., assignor to Argus
Chemical Corporation, Brooklyn, N.Y.
No Drawing. Original application Sept. 15, 1965, Ser. No. 487,614, now Patent No. 3,395,112, dated July 30, 1968. Divided and this application Jan. 25, 1968, Ser. No. 718,281
Int. Cl. C07f 15/04; C08f 45/62
U.S. Cl. 260—439                                    8 Claims

ABSTRACT OF THE DISCLOSURE

Nickel organophosphites are provided which have the formula

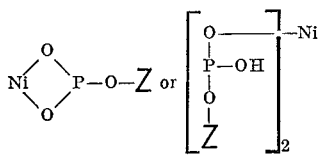

wherein Z is a monovalent or polyvalent organic radical having from one to about thirty carbon atoms, the nickel organophosphite containing at least one organic radical per molecule, but containing no more than one such organic radical per phosphite group. In addition, nickel organophosphites having at least one bivalent nickel atom ionically linked to oxygen to phosphorus, and at least one organic radical including a phenolic hydroxyl group linked to oxygen to phosphorus are also provided. These compounds have utility as stabilizers for polyolefins.

---

This application is a division application Ser. No. 487,-614, filed Sept. 15, 1965, now Pat. No. 3,395,112, issued July 30, 1968.

This invention relates to nickel organophosphites which are useful in improving resistance of olefin polymers to light-induced deterioration.

Polypropylene is a tough, high-melting polymeric material, but in several respects its stability leaves much to be desired. The polymer shows a tendency to decrease rapidly in melt viscosity, and then to become brittle, when kept at elevated temperatures for the time required in milling, calendering, extrusion, injection molding and fiber-forming equipment. This deterioration is particularly serious when the polymer is worked in the molten state in the presence of oxygen, e.g., air. Polypropylene is also subject to deterioration in physical properties when exposed to light, particularly to ultraviolet light or sunlight, over long periods of time, and after such exposure has very poor resistance to heat. Shaped polymers show a tendency to discolor, to become distorted, to crack, and to powder around the edges upon exposure to sunlight and during aging, and especially when heated at moderately elevated temperatures as in an accelerated aging process, and again, the problem is accentuated in the presence of oxygen. In many cases, it is thought, this is due to residual metal catalyst, which is quite difficult to remove from the polymer.

Among the highly colored organonickel compounds that have been proposed are compounds containing carbon, hydrogen and oxygen, such as the nickel salts of phenols (green, Daly U.S. Pat. No. 2,340,938); nickel salts of acetylacetone (green, French Pat. No. 1,300,616); nickel salts of hydroxy-ethylated polyols (green, British Pat. No. 959,043 to Ferro Corporation); nickel salts of o-hydroxy aromatic aldehydes or carboxylic acids (green, British Pat. No. 945,050 to Hercules Powder Company); compounds containing carbon, hydrogen and nitrogen, such as the nickel salts of aliphatic polyamines (green, British Pat. No. 945,050 to Hercules Powder Company); compounds containing carbon, hydrogen and sulfur, such as the nickel salts of aryl mercaptans Ar-XII and their selenium and tellurium analogs (maroon, Daly, U.S. Pat. No. 2,340,938); compounds containing carbon, hydrogen, oxygen and nitrogen, such as the nickel salts of bis-salicylidene ethylenediamines (golden brown; Burgess U.S. Pat. No. 2,615,860); and nickel glyoximes (red, Belgian Pat. No. 640,272) nickel salts of alpha-aminocarboxylic acids (green, Soeder U.S. Pat. No. 3,102,107); nickel salts of o-hydroxyphenylbenzotriazoles (green, Matlack U.S. Pat. No. 3,074,909); nickel salts of o-hydroxybenzylidene-monoamines, aminoacids or acylhydrazones (green, Matlack German Pat. No. 1,147,753); nickel salts of alkylhydroxamic acids (green, Matlack French Pat. No. 1,343,-984); nickel salts of 1,2-oximinoketones (green, Matlack U.S. Pat. No. 3,107,232); nickel complexes with 1,3-iminoketones (green, British Pat. No. 945,050 to Hercules Powder Company); nickel salts of 8-hydroxyquinoline complexes with amines or epoxides (green, Matlack U.S. Pat. No. 3,127,372); and nickel salts with aliphatic aminoalcohols (green, British Pat. No. 945,050 to Hercules Powder Company); compounds containing carbon, hydrogen, oxygen and sulfur, such as the nickel salts of bis-alkylphenol sulfides, taken either alone (green, Daly U.S. Pat. 2,340,938, Fuchsman U.S. Pat. Nos. 2,971,940 and 2,971,941) or combined with alkylidene-bis-alkyl-phenols (green, Dickson U.S. Pat. No. 3,006,885) or with o-hydroxyphenylbenzotriazoles (green, Dickson U.S. Pat. No. 3,074,910) or combined with cobalt dialkyldithiocarbamates (maroon, British Pat. No. 948,502 to Sun Oil Company); nickel salts of bis-alkylphenol sulfoxides and sulfones (Breslow U.S. Pat. No. 3,072,601 and British Pat. Nos. 956,102 and 958,830 to Hercules Powder Company); nickel salts of hydroxyethyl thioethers, alone or in combination with bis-alkyl sulfides (green, British Pat. No. 959,043 to Ferro Corporation); compounds containing carbon, hydrogen, nitrogen and sulfur, such as the nickel salts of N,N-disubstituted dithiocarbamates (maroon, British Pat. No. 948,501 to Sun Oil Company) and combinations thereof with bis-alkylphenol sulfides (maroon, British Pat. No. 948,502 to Sun Oil Company) and with cobalt derivatives of N,N-disubstituted dithiocarbamates (maroon, British Pat. No. 948,504 to Sun Oil Company); compounds containing carbon, hydrogen, oxygen, nitrogen and sulfur, such as the nickel salts of amine complexes of bis-alkylphenol sulfides with benzophenones (green, British Pats. No. 943,081 and 985,199 to American Cyanamid); and compounds containing carbon, hydrogen, oxygen, sulfur and phosphorus, such as nickel salts of dihydrocarbyl dithiophosphates (British Pat. No. 945,050 to Hercules Powder Company).

A number of compounds have been suggested as stabilizers for polypropylene to improve its heat and light stability. The heat stabilizers most commonly used today are organic triphosphites, including the thiophosphites, phenols, and particularly the bisphenols such as 4,4'-thiobisphenol, 4,4'-butylidene-bis-phenol, and Bisphenol A, as well as thiodipropionic acid esters, such as dilauryl thiodipropionate, and polyvalent metal salts of organic acids, such as zinc-2-ethyl-hexoate. Stabilizer combinations of these types are disclosed in a variety of patents, including Belgian Pats. Nos. 577,252 and 582,162, and British Pats. Nos. 851,670 and 890,468. Light stabilizers commonly employed with the heat stabilizers include the 2-hydroxybenzophenones and various derivatives thereof.

Organonickel compounds have been proposed as light stabilizers for polyolefin resins. However, nickel compounds have presented difficulties in use, because they tend to depreciate the heat-stabilizing effectiveness of the other heat stabilizers in the composition, and in addition, because they tend to be highly colored, they introduce a strong color into the polymer composition, which is, of course, disadvantageous in many end uses.

Nickel forms two types of organic compounds, one type in which the nickel is attached to the organic radicals by coordinate bonds, and has an apparent valence of four, and one type in which the bonds are ionic, and nickel is bivalent. The first type is illustrated by the tetrakis (triorganophosphite) nickel compounds of U.S. Pat. No. 3,152,158, issued Oct. 6, 1964 and the organonickel carbonyl complexes of British Pat. No. 979,553 dated Jan. 6, 1965. However, only the compounds of the second type have been proposed as stabilizers for polyolefins.

In accordance with the instant invention, it has been determined that nickel organophosphites significantly reduce the rate of increase in melt index of olefin polymers and particularly polypropylene under exposure to light, contribute little, if any, color, in contrast to previously used nickel compounds, and also improve retention of color and other important properties of the polymer. The invention accordingly provides nickel organophosphites and stabilizer compositions for olefin polymers and particularly polypropylene containing the same, which improve the resistance to light-induced deterioration of such polymers, and in combination with other olefin polymer heat and/or light stabilizers improve resistance to light and to both heat and light-induced deterioration for long periods of time, as evidenced by observation of melt index or mechanical properties after exposure to light.

Purity of propylene polymers, extent of degradation, and resistance to embrittlement over long periods of time are characteristics capable of evaluation by observation of the change in melt index of the particular polymer. There is a direct correlation between the rate of increase in melt index and the rate of deterioration in the abovementioned physical properties of the polymer.

The nickel organophosphites in accordance with the invention are nickel salts of organophosphites wherein the nickel has a valence of two, at least one organic radical is linked to phosphorus through oxygen, and at least one of the oxygen atoms of the phosphite is ionically linked to nickel. These phosphites can include two phosphite radicals per nickel atom, or can have two oxygens of one phosphite group linked to one nickel atom. Any organic radical can be linked through oxygen to the phosphorus.

Thus, the nickel organophosphites of the invention can be defined by the following formula:

(1) 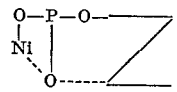

One of the oxygens of the phosphite group is linked to nickel, and one of the oxygens of the phosphite group is linked to the organic radical Z the other oxygen being linked either to nickel or to an organic radical, as indicated by the dashed lines.

Z can be monovalent, or polyvalent, including bivalent and higher, in which latter cases polymers can exist also.

It will be evident that in the case where there are two phosphite groups linked to one nickel, the nickel organophosphite is a nickel bis(mono- or diphosphite) and the formula will take the form:

(2) 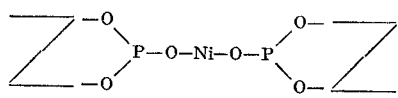

in which each valence of the nickel is linked to a phosphite group. In the bis(monophosphites) the Z is two radicals, and one such radical of each phosphite group is hydrogen. In the bis(di-phosphites) the hydrogens are absent, and both Z radicals are organic radicals.

In the case where two valences of nickel are linked to oxygens of the phosphite group, the compounds is a nickel monophosphite and the formula takes the form:

(3) 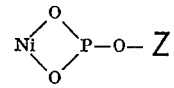

The nickel bis(monophosphite) of (2) and the nickel monophosphites (3) are believed to be new compounds.

In these formulae, Z represents hydrogen or an aliphatic, aromatic, nonaromatic alicyclic, or heterocyclic radical, whose molecular size is not critical, but which preferably has from about one to about thirty carbon atoms. In the case of Formula 2 above Z may be two monovalent radicals attached one to each oxygen, in which case one of the radicals can be a hydrogen atom, or Z may be a single bivalent radical. In the case where Z is attached to only one oxygen atom, the organic radicals are monovalent, or, if bivalent, are attached to the same or to another phosphite group, in which latter case the formula takes the form:

(4) 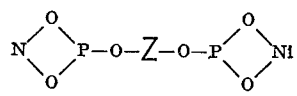

Polymers are also contemplated, in the case where Z is a bivalent or a higher polyvalent radical. Polymeric species are too numerous and too varied to be susceptible of illustration by a simple formula, but the following will show some types wherein Z is bivalent:

(5) 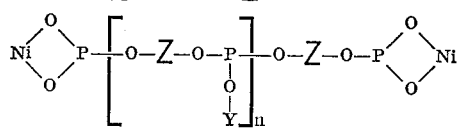

(6) 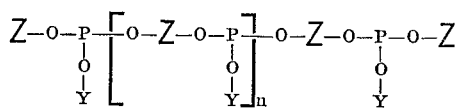

Y is another Z group or a nickel organophosphite group, and $n$ is the number of bracketed units, and can range from 1 to about 20.

The Z radicals preferably are hydrocarbon radicals, but they can in many cases include one or more of the same or different inert substituents, such as hydroxy, including phenolic hydroxyl; halogen such as chlorine, fluorine or bromine; nitro; and oxy or thio ether groups.

A preferred Z radical is a phenolic radical, and especially a bis-phenolic radical, of the type:

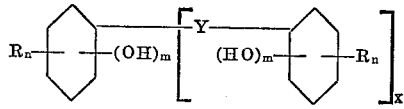

where R is an alkyl or alkaryl group having from one to about thirty carbon atoms, $m$ is an integer representing the number of OH groups, and $n$ is an integer representing the number of R radicals, and $m$ is within the range from one to four, and $n$ is within the range from zero to five, $n$ preferably is one or two, and $m$ preferably is one or two. $x$ is an integer representing the number of

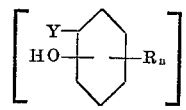

radicals, and is within the range from zero to about four, and Y is a bivalent linking group, where Y is an oxygen or sulfur atom, or an alkylene or alicyclidene or arylene or a mixed alkylene-alicyclidene or alkylenearylidene group, having a straight or branched chain, whose total number of carbon atoms ranges from one to about eighteen.

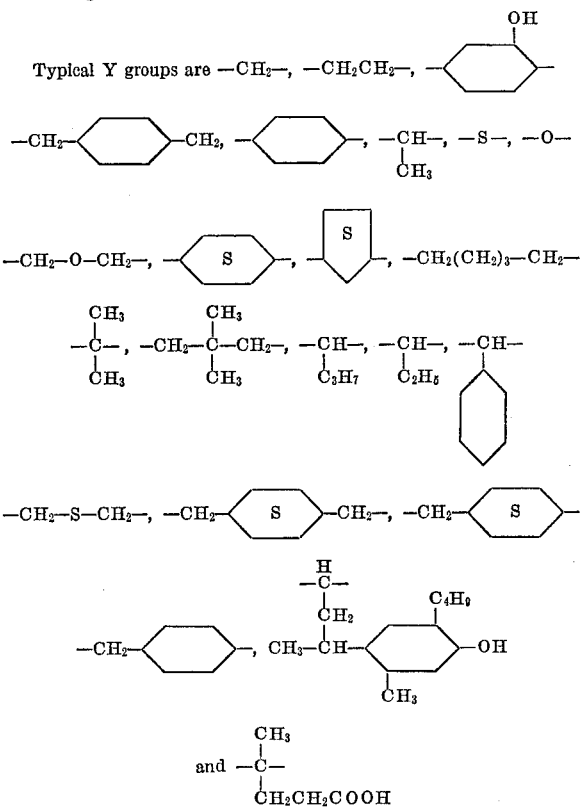

Nickel phosphites including a phenolic radical have heat-stabilizing effectiveness as well as light-stabilizing effectiveness.

The toltal number of carbon atoms of the Z groups is from one to about thirty carbon atoms.

As typical monovalent Z and R radicals, there can be mentioned methyl, ethyl, propyl, isopropyl, sec-butyl, tert-butyl, isobutyl, amyl, isoamyl, hexyl, isohexyl, octyl, isooctyl, 2-ethyl hexyl, nonyl, lauryl, myristyl, octadecyl, behenyl, palmityl, oleyl, linoleyl, ricinoleyl, ethoxyethyl, ethoxymethyl, mercaptopropyl, phenoxyphenyl, hydroxyethyl, glyceryl, butoxyethoxyethyl, chloroethyl, bromopropyl, hydroxybutyl, phenyl, p-xylyl, tolyl, α-naphthyl, β-naphthyl, benzyl, α-phenethyl, β-phenethyl, p-(1-(4-hydroxyphenyl) butylphenyl, p-(4-hydroxyphenyl thio) phenyl, p-(1-(4-hydroxyphenyl) cyclohexyl) phenyl, 4-bromobenzyl, hydroxyphenyl, 3-bromophenyl, 2-chlorophenyl, 2,4-dichlorophenyl, 2,4-dihydroxyphenyl, p-cresyl, m-methoxyphenyl, p-nitrophenyl, cyclohexyl, cyclopentyl, tetrahydrofurfuryl, cycloheptyl; p-(1-(2-hydroxy-4-tert-butyl phenyl) butylidene phenyl), p-(1-(2 - hydroxy-4-methyl phenyl) cyclohexylidene phenyl); p-(1-(2-hydroxy phenyl) methylene phenyl); 1,4-p-(1-(2-hydroxy-4-isopropylphenyl) phenylene-4-isopropyl phenyl); 2,2-p-(1-(2-hydroxy-5,6-dimethyl phenyl) ethylene 5,6-dimethyl phenyl).

Typical bivalent Z radicals include ethylene, 1,4-tetramethylene, 1,3 - trimethylene, 1,1-dimethyl ethylene-1,2; 2,2'-biphenylene, 1,8-naphthalene, 1,4-diphenylene, 1,4-cyclohexylene, 1,2-propylene, 1,3-cyclopentylene, 1,3-butylene, 1,5-amylene, 1,3-phenylene, and phenylethylene.

Exemplary nickel phosphites are nickel monoisooctyl phosphite, nickel bis(phenyl phosphite), nickel monophenyl mono-2-ethylhexyl phosphite, nickel bis(di-tolyl phosphite), nickel bis(isooctyl phosphite), nickel monoisooctyl monotolyl phosphite, nickel bis(di - cyclohexyl phosphite), nickel monophenyl monocyclohexyl phosphite, nickel bis(diethylphenyl phosphite), nickel bis(cresyl phosphite), nickel bis(dimethylphenyl phosphite), nickel monocresyl monodimethyl phenyl phosphite, nickel octadecyl phosphite, nickel dodecyl phosphite, nickel monodiphenyl monophenyl phosphite, nickel mono-t-octylphenyl phosphite, nickel mono-t-nonyl phenyl phosphite, nickel monobenzyl phosphite, nickel monobenzyl monoisopropyl phosphite, nickel mono-α-naphthyl phosphite, nickel bis-(di-α-naphthyl phosphite), ethylene di(nickel phosphite), nickel di(propylene phosphite), ethylene oxyethylene di(nickel phosphite), and 1,4-phenylene di(nickel phosphite), nickel bis-(2-ethyl hexyl phosphite), nickel bis-(di-(2-ethylhexyl phosphite), nickel mono-(2-ethylhexyl phosphite), nickel mono-(2-ethylhexyl phosphite), nickel monophenyl phosphite, nickel bis(monophenyl mono-2-ethylhexyl phosphite), nickel monotolyl phosphite, nickel bis(monoiso-octyl monotolyl phosphite), nickel monocyclohexyl phosphite, nickel bis(monophenyl monocyclohexyl phosphite), nickel monodiethylphenyl phosphite, nickel monocresyl phosphite, nickel monodimethylphenyl phosphite, nickel bis(monocresyl monodimethyl phenyl phosphite), nickel bis-(dioctadecyl phosphite), nickel bis-(dodecyl phosphite, nickel bis-(diphenyl phenyl) phosphite, nickel bis-(di-t-octylphenyl phosphite), nickel bis-(t-nonyl phenyl phosphite), nickel bis-(benzyl phosphite), nickel bis-(monobenzyl monoisopropyl phosphite), nickel bis-(α-naphthyl phosphite), nickel mono-β-naphthyl phosphite, nickel bis-(dibenzyl phosphite), ethylene, nickel bis(ethylene phosphite), nickel bis(neopentylene phosphite), nickel bis(ethylene oxyethylene phosphite) and nickel bis(1,4-phenylene phosphite).

The following nickel compounds are more clearly represented by formula than by name:

(1) 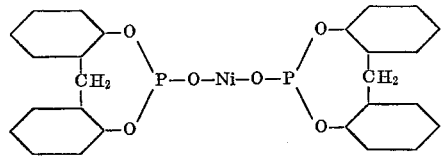

(2) 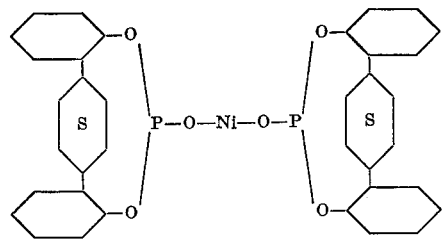

(3) 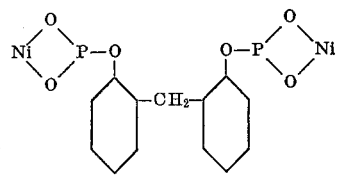

(4) 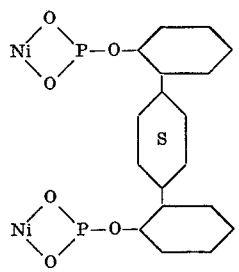

(5) 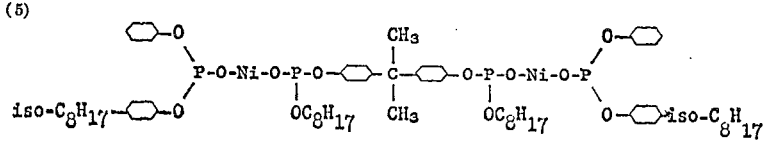

(6) 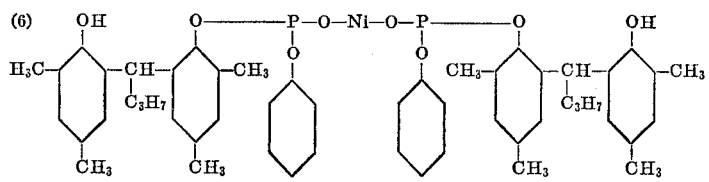

(7) 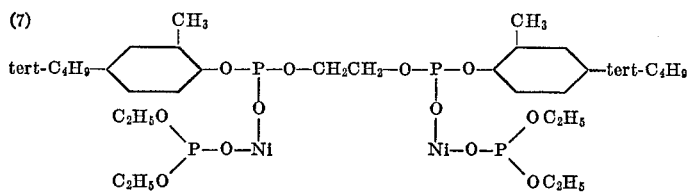

(8) 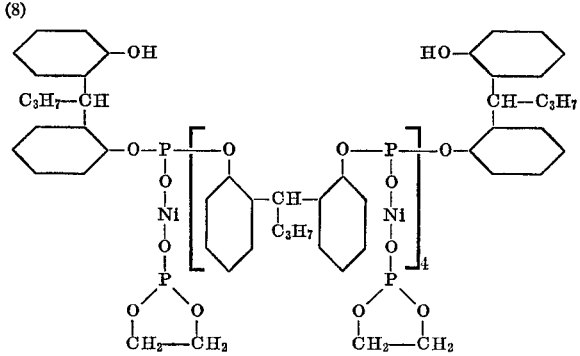

(9) 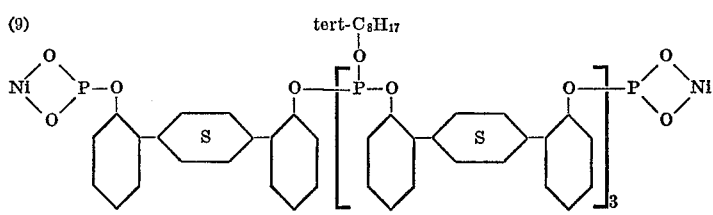

(10) 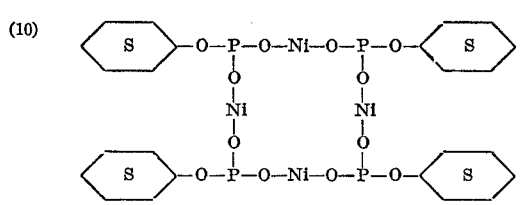

(11) 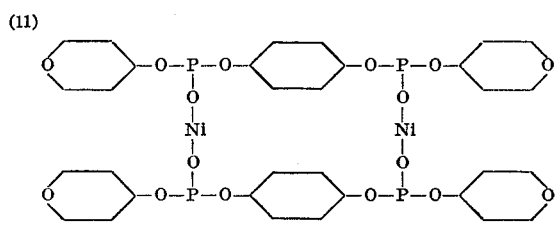

(12) 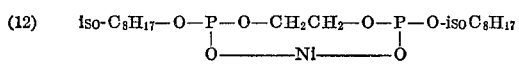

(13) 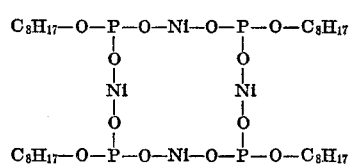

All of these nickel organophosphites are effective light stabilizers for polyolefin resins, in which environment they do not interfere with heat stabilizers, and do not impart strong colors. However, the nickel monophosphites and bis-(monophosphites) are preferred, because, unlike the bis-(diphosphites), they are resistant to hydrolysis by moisture. In fact, in preparatory procedures involving hydrolysis with water, the monophosphites are formed preferentially, and are stable, while the bis-(diphosphites) also can be converted to the monophosphites by hydrolysis with water. Therefore, if a bis-(diphosphite) is desired, the reaction system must be kept as dry as possible.

The nickel monophosphite and diphosphite compounds are usually prepared by reaction of the corresponding

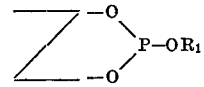

compound, where $R_1$ is hydrogen or an organic radical that is lost in the reaction, such as an aliphatic, cycloaliphatic, or mixed aliphatic aromatic or aliphatic cycloaliphatic group, and Z is as defined above, monofunctional (monovalent Z radicals) or polyfunctional (bivalent and higher polyvalent Z radicals), with a nickel compound, such as the oxide, hydroxide, or a salt (optionally, when a nickel salt is used, in the presence of an alkaline compound to take up the salt anion, such as sodium hydroxide), in proportions stoichiometrically calculated to give the desired proportion of such radicals in the final molecule. Mixtures of the various possible species usually are obtained, and the possibilities are much multiplied in the case of polyfunctional alcohols and phenols. The reaction proceeds quickly and quantitatively under reflux, desirably in solution in water or in an inert solvent such as benzene, toluene, cyclohexane or petroleum ether. In the presence of water, the monophosphite is obtained; in an anhydrous medium, the diphosphite is obtained. For a quantitative reaction when a triphosphite is used, the by-product of the transesterification (phenol from triphenyl phosphite, for example) is removed by distillation as the reaction proceeds.

Typical varieties possible from the transesterification of propylene glycol-1,3, nickel hydroxide, and triphenyl phosphite are:

(1)
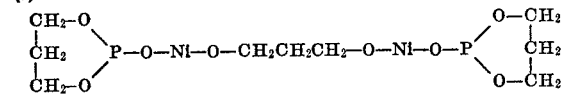

(2)
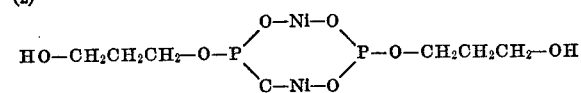

(3)

(4)
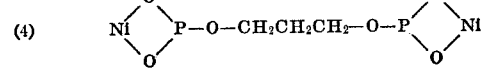

(5)
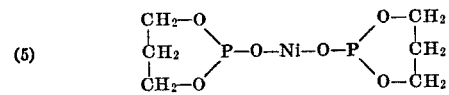

(6)
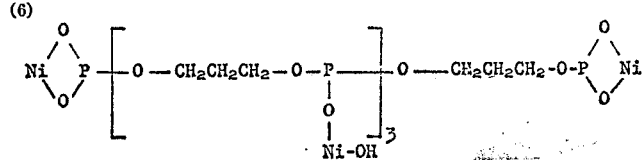

(7)
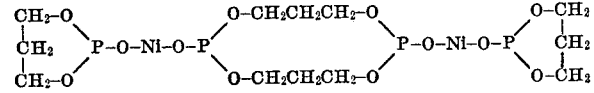

With trifunctional hydroxy compounds, even more permutations are possible.

The following examples illustrate preferred embodiments of the procedure for preparing the nickel organophosphites of the invention.

EXAMPLES A TO I

A number of nickel monophosphites and bis-(monophosphites) were prepared using the following procedure, taking nickel bis-(monoisooctyl phosphite) as exemplary.

Di-iso-octyl phosphite 91.8 g. (0.3 mole) in a 3-neck flask was treated with 12 g. sodium hydroxide (0.3 mole) dissolved in 100 ml. water by dropwise addition with stirring during seventy-five minutes. An exothermic reaction brought the mixture to 74° C. by the end of the addition of the sodium hydroxide solution.

At this point, heating was begun, and a solution of nickel dichloride (25 g. of the hexahydrate in 150 ml. water, 0.15 mole) was added during fifteen minutes, with stirring and heating continued for one hour. The temperature had reached 91° C. after the addition of the nickel chloride solution and 87° C. after the heating period.

The reaction mixture was then taken up in 200 ml. benzene, washed with four portions of hot water to remove soluble salts, and evaporated under vacuum to 85° C. pot temperature.

The resulting product was a viscous, hazy, green liquid, and analyzed 7.93% nickel (by titration with ethylene diamine tetracetic acid). Addition of 11.26 g. mineral spirits (aliphatic hydrocarbon solvent mixture) to 35 g. of the above product gave a clear, mobile solution containing 6% nickel.

A portion of the viscous liquid product was diluted with two volumes of acetone. A light green solid precipitated. After drying, this analyzed 13.3% nickel and 12.7% phosphorus. The salt $$Ni(O-\overset{OH}{\underset{|}{P}}-OC_8H_{17})_2$$

requires nickel 13.2% and phosphorus 13.9%.

Using the same procedure, the following nickel monophosphites and bis(monophosphites) were prepared:

| Example | Amount of reactants | | Acid phosphite | Reaction product |
|---|---|---|---|---|
| | NiCl₂·6H₂O, g. | NaOH, g. | | |
| B | 47.6 | 12.6 | Dibutyl phosphite, 77 g | Ni-(O—P(OH)—O—C₄H₉)₂ |
| | | | | Crystals from water, 16.3% Ni, (requires 17.6% Ni). |
| C | 7.5 | 2.2 | Di-(mixed nonyl phenyl and dinonyl phenyl)phosphite, 23.5 g. | 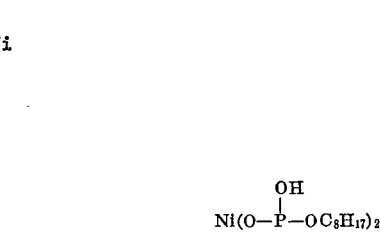 |
| | | | | Green, solid, 7.8% Ni. |
| D | 11.9 | 4.0 | Di-isodecyl phosphite, 36.2 g | Ni-(O—P(OH)—O—C₁₀H₂₁-iso)₂ |
| | | | | Product was solution in isodecyl alcohol. |

TABLE—Continued

| Example | Amount of reactants | | Acid phosphite | Reaction product |
|---|---|---|---|---|
| | NiCl$_2$ 6H$_2$O, g. | NaOH, g. | | |
| E | 11.9 | 4.0 | Di-isotridecyl phosphite, 44.6 g. | Ni-(O—P(OH)—O—C$_{13}$H$_{27}$-iso)$_2$ <br> Product was solution in iso-tridecyl alcohol, Ni 5.4%, calculated Ni 5.7%. |
| F | *23.8 | 4.0 | Mono-isodecyl phosphite, 22.2 g. | Ni-(O—P(OH)—O—iso—C$_{10}$H$_{21}$)$_2$ <br> Product was light green solid, 12.35% Ni, calculated 11.9%. |
| G | *23.8 | 4.0 | Mono-isotridecyl phosphite, 26.1 g. | Ni-(O—P(OH)—O—C$_{13}$H$_{27}$)$_2$ <br> Light green solid, M. 133–38° C., 10.85% Ni, calculated 10.2%. |

\* These two preparations had 100% excess of NiCl$_2$ or only 50% of NaOH necessary to react all the NiCl$_2$.

The following nickel monophosphites also were prepared:

| Example | Amount of reactants | | Acid phosphite | Reaction product |
|---|---|---|---|---|
| | NiCl$_2$ 6H$_2$O, g. | NaOH, g. | | |
| H | 23.8 | 8.0 | Mono-isodecyl phosphite, 22.2 g. | Ni(O)$_2$P—O—isoC$_{10}$H$_{21}$ <br> Pale green solid, 17.0% Ni, calculated 21.1%. |
| I | 23.8 | 8.0 | Mono-isotridecyl phosphite, 26.4 g. | Ni(O)$_2$P—O—isoC$_{13}$H$_{27}$ <br> Pale green solid, 17.2% Ni, calculated 18.0%. |

EXAMPLES J AND K

Several nickel bis(dialkyl phosphites) were prepared by the following procedure. As the reaction of dialkyl phosphite with aqueous solutions of nickel chloride and base gives the nickel compounds of monoalkyl phosphites, the salts of the dialkyl phosphites were made in an anhydrous medium.

Di-isodecyl phosphite (72.9 g., 0.2 mole) in benzene (300 ml.) was converted to the sodium salt by addition of metallic sodium (4.6 g., 0.2 gram-atom) in small pieces with stirring. After the metal had been added, the mixture was heated to 75° C. and stirred overnight without further heating to complete the formation of the salt.

Nickel chloride hexahydrate (23.8 g., 0.1 mole) and 150 ml. of 2-ethoxyethanol were stirred together and heated to distill out the water of hydration along with some 2-ethoxyethanol. After some distillate had been collected, 50 ml. fresh 2-ethoxyethanol were added to the nickel chloride solution, and the distillation continued. By repeating this procedure, a total of 150 ml. distillate was collected.

The above solutions of dried nickel chloride and sodium di-isodecyl phosphite were mixed and evaporated to about one-quarter the original volume. Acetone was added to the resulting yellowish viscous liquid to precipitate golden-yellow plate-like crystals of the nickel compound, 9.0% nickel, calculated 7.5%:

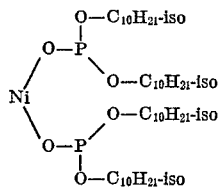

The same procedure was also carried out with di-isotridecyl phosphite, giving a product of similar appearance, 7.8% nickel, calculated 6.2%.

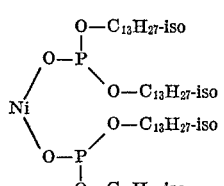

EXAMPLES L AND M

Using the procedure of Examples A to I, the following nickel monophosphite and bis-(monophosphite) were prepared:

| Example | Amount of reactants | | Phosphite | Reaction product |
|---|---|---|---|---|
| | NiCl₂·6H₂O, g. | NaOH, g. | | |
| L | 11.9 | 4.0 | Transesterified product from 16.8 g. t-butyl hydroquinone, 23.4 diphenyl phosphite, at 110° C. for 3 hours, phenol stripped at 15 mm. pressure. | $Ni\left[-O-\overset{OH}{\underset{\|}{P}}-O-\underset{}{\bigcirc}\overset{t-C_4H_9}{-}OH\right]_2$ |
| M | 119.5 | 40.0 | Transesterified product from 118 g. bisphenol A and 155 g. triphenyl phosphite, at 120° C. for 2 hours, in presence of 0.5 g. Na metal, no stripping. | (structure: Ni-O-O-P-O-phenyl-C(CH₃)₂-phenyl-OH) |

EXAMPLES N AND O

Using the procedure of Examples J and K, the following nickel bis-(diphosphites) were prepared:

| Example | Amount of reactants | | Acid phosphite | Reaction product |
|---|---|---|---|---|
| | NiCl₂·6H₂O, g. | Na, g. | | |
| N | 11.9 | ¹ 6.9 | Transesterified product of 33.6 g. t-butyl hydroquinone and 23.4 g. diphenyl phosphite at 110° C. for 2 hours, phenol stripped at 15 mm. | $Ni\left[-O-P-\left[O-\underset{}{\bigcirc}\overset{t-C_4H_9}{-}OH\right]_2\right]_2$ |
| O | 2.38 | ¹ 1.38 | Transesterified product from 16.8 g. of 2,2'-methylenebis-(4-methyl-6-1(1'-methylcyclohexyl)phenol) and 5.4 g. diphenyl phosphite at 110° C. for 2 hours, phenol stripped at 15 mm. | (complex structure with S, CH₃, CH₂, HO groups) |

¹ Sufficient to form the sodium salt of the acid phosphite and of the free phenolic hydroxyls of the phenol.

The nickel organophosphites of the invention are effective light stabilizers when used with olefin polymers, and especially propylene polymers, as the sole stabilizer. They are characterized by a very low color contribution, and their effectiveness is particularly evidenced by an improved resistance of the resin to an increase in melt index upon exposure to sunlight for long periods of time. They can also be used in conjunction with other olefin and propylene polymer light and heat stabilizers, wherein they are effective in supplementing the stabilizing effect contributed by the other stabilizers without disadvantageously affecting the desired properties of the polymer. In many cases, an enhanced or synergistic effect is observed.

Having regard to the foregoing disclosure, the following is claimed as the inventive and patentable embodiments thereof:

1. A nickel organophosphite having one of the formulae:

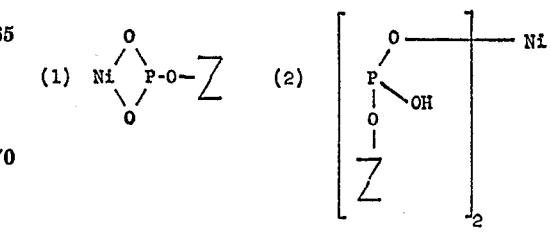

wherein Z is an organic radical selected from the group consisting of monovalent hydrocarbyl groups and monovalent hydrocarbyl groups substituted by inert substituent groups selected from the group consisting of hydroxy groups, halogen atoms, nitro groups, and oxyether and thioether groups, said radical having from one to about thirty carbon atoms.

2. A nickel organophosphite having one bivalent nickel atom ionically linked through oxygen to a phosphorus atom of a phosphite group and at least one organic radical selected from the group consisting of monovalent hydroxy substituted hydrocarbyl groups wherein the hydroxy group is attached to a phenyl ring and such monovalent hydroxy-substituted hydrocarbyl groups further substituted by an inert substituent selected from the group consisting of hydroxyl, halogen atoms, nitro groups and oxyether and thioether groups, said radical having from one to about thirty carbon atoms, and the organic radical being linked through oxygen to phosphorus, and there being no more than one such organic radical per phosphite group.

3. A nickel organophosphite in accordance with claim 1 having the formula

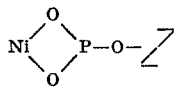

4. A nickel organophosphite in accordance with claim 1 having the formula

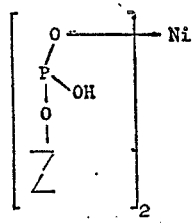

5. A nickel organophosphite in accordance with claim 1 wherein Z is a hydrocarbyl radical.

6. A nickel organophosphite in accordance with claim 1 wherein Z is a hydroxy-substituted hydrocarbyl radical.

7. A nickel organophosphite in accordance with claim 1 wherein Z is a phenolic radical having at least one free phenol hydroxyl group.

8. A nickel mono-alkylphosphite having the structural formula, $Ni[(OP)(OR)(OH)]_2$, wherein R is an alkyl group containing 1 to 12 carbon atoms.

References Cited

UNITED STATES PATENTS

| | | | |
|---|---|---|---|
| 2,224,695 | 12/1940 | Prutton | 148—6.5 |
| 2,346,155 | 4/1941 | Denison et al. | 252—32 |
| 2,432,095 | 12/1947 | Frey | 252—46.7 |
| 3,219,605 | 11/1965 | Klemchuk | 260—23 |
| 3,271,481 | 11/1968 | Kujawa et al. | 260—429 |

FOREIGN PATENTS

| | | | |
|---|---|---|---|
| 1,412,312 | 8/1965 | France | 260—45.75 |

OTHER REFERENCES

Kosolapoff: Organo - Phosphorus Compound, John Wiley and Sons, New York, N.Y., 1950, p. 193.

TOBIAS E. LEVOW, Primary Examiner

A. P. DEMERS, Assistant Examiner

U.S. Cl. X.R.

260—45.75, 345.1, 967

9-110 Div.

PO-1050
(5/69)

UNITED STATES PATENT OFFICE
CERTIFICATE OF CORRECTION

Patent No. 3,647,841　　　　　　　　　Dated　March 7, 1972

Inventor(s)　Otto S. Kauder

It is certified that error appears in the above-identified patent and that said Letters Patent are hereby corrected as shown below:

Column 2, line 5　　:　"Ar-XII" should be --Ar-XH--

Column 4, line 15　:　"Formula 2" should be --Formula (2)--

Column 4, line 52　:　after "radical" insert --derived from a bis-phenol--

Column 5, line 40　:　"toltal" should be --total--

Column 9, line 23　:

$$\text{"HO—CH}_2\text{CH}_2\text{CH}_2\text{—O—P} \underset{\text{C-Ni-O}}{\overset{\text{O-Ni-O}}{\diamond}} \text{P—O—CH}_2\text{CH}_2\text{CH}_2\text{—OH"}$$　should be $$\text{--HO—CH}_2\text{CH}_2\text{CH}_2\text{—O—P} \underset{\text{O-Ni-O}}{\overset{\text{O-Ni-O}}{\diamond}} \text{P—O—CH}_2\text{CH}_2\text{CH}_2\text{—OH--}$$

Column 12, Table　:　"G　　Ni(O-P(OH)-O-C$_{13}$H$_{27}$)$_2$"　should be

--G　　Ni(O-P(OH)-O-iso-C$_{13}$H$_{27}$)$_2$--

Signed and sealed this 3rd day of April 1973.

(SEAL)
Attest:

EDWARD M. FLETCHER, JR.　　　　　　　ROBERT GOTTSCHALK
Attesting Officer　　　　　　　　　　　Commissioner of Patents